US009804338B2

(12) United States Patent
ten Have et al.

(10) Patent No.: US 9,804,338 B2
(45) Date of Patent: Oct. 31, 2017

(54) PLUG CONNECTOR TO COUPLE A HYBRID CABLE TO A RECEPTACLE

(71) Applicant: CCS Technology, Inc., Wilmington, DE (US)

(72) Inventors: Eric Stephan ten Have, Berlin (DE); Michael Wimmer, Berlin (DE)

(73) Assignee: CCS Technology, Inc., Wilmington, DE (US)

( * ) Notice: Subject to any disclaimer, the term of this patent is extended or adjusted under 35 U.S.C. 154(b) by 0 days.

(21) Appl. No.: 15/092,947

(22) Filed: Apr. 7, 2016

(65) Prior Publication Data

US 2016/0299295 A1   Oct. 13, 2016

(30) Foreign Application Priority Data

Apr. 10, 2015 (EP) ................................. 15163211

(51) Int. Cl.
| | |
|---|---|
| *G02B 6/36* | (2006.01) |
| *G02B 6/38* | (2006.01) |
| *G02B 6/42* | (2006.01) |
| *G02B 6/32* | (2006.01) |
| *H01R 13/42* | (2006.01) |
| *H01R 24/28* | (2011.01) |
| *H01R 24/76* | (2011.01) |

(52) U.S. Cl.
CPC ............. *G02B 6/3817* (2013.01); *G02B 6/32* (2013.01); *G02B 6/3849* (2013.01); *G02B 6/3869* (2013.01); *G02B 6/3882* (2013.01); *G02B 6/4293* (2013.01); *H01R 13/42* (2013.01); *H01R 24/28* (2013.01); *H01R 24/76* (2013.01)

(58) Field of Classification Search
CPC ...... G02B 6/3817; G02B 6/32; G02B 6/3849; G02B 6/3869; G02B 6/3882; G02B 6/4293; H01R 13/42; H01R 24/28; H01R 24/76
USPC ............................................. 385/97, 137, 77
See application file for complete search history.

(56) References Cited

U.S. PATENT DOCUMENTS

| | | | | |
|---|---|---|---|---|
| 5,757,993 A | * | 5/1998 | Abe .......................... | G02B 6/32 385/34 |
| 6,341,899 B1 | * | 1/2002 | Shirakawa ........... | G02B 6/3817 385/53 |

(Continued)

FOREIGN PATENT DOCUMENTS

| | | |
|---|---|---|
| JP | 04685096 B2 | 5/2011 |
| WO | 2014/186436 A1 | 11/2014 |

OTHER PUBLICATIONS

European Search Report/Office Action for Application No. 15163211.4, dated Oct. 20, 2015, 6 pages.

*Primary Examiner* — Ellen Kim
(74) *Attorney, Agent, or Firm* — Michael E. Carroll, Jr.

(57) ABSTRACT

A plug connector for a hybrid cable comprises a fiber and wire holder to hold at least one optical fiber and at least one electrical conductor of the hybrid cable. The plug connector comprises at least one optical device being configured such that a light beam received from the at least one optical fiber at a first side of the at least one optical device is collimated and coupled out at the second side of the at least one optical device. The plug connector comprises an electrical contact pin to be coupled to the at least one electrical conductor of the hybrid cable. The electrical contact pin has a structure being configured to be engaged in a complimentary receptacle to mechanically fix the plug connector to the receptacle.

16 Claims, 10 Drawing Sheets

(56) References Cited

U.S. PATENT DOCUMENTS

| | | | |
|---|---|---|---|
| 6,588,938 B1* | 7/2003 | Lampert | G02B 6/3817 |
| | | | 385/58 |
| 7,802,926 B2* | 9/2010 | Leeman | G02B 6/3825 |
| | | | 385/137 |
| 8,520,989 B2* | 8/2013 | Isenhour | G02B 6/3817 |
| | | | 385/33 |
| 8,573,861 B2 | 11/2013 | Terlizzi et al. | |
| 9,239,436 B2* | 1/2016 | Isenhour | G02B 6/3893 |
| 2006/0147172 A1* | 7/2006 | Luther | G02B 6/4441 |
| | | | 385/135 |
| 2007/0160327 A1* | 7/2007 | Lewallen | G02B 6/3817 |
| | | | 385/53 |
| 2011/0229078 A1 | 9/2011 | Isenhour et al. | |
| 2013/0087690 A1 | 4/2013 | Sloey et al. | |
| 2013/0089290 A1* | 4/2013 | Sloey | G02B 6/3817 |
| | | | 385/74 |
| 2013/0330962 A1 | 12/2013 | Tziviskos et al. | |
| 2014/0141658 A1* | 5/2014 | Bazenas | H01R 13/111 |
| | | | 439/730 |
| 2014/0147078 A1* | 5/2014 | Bhagavatula | G02B 6/32 |
| | | | 385/33 |

\* cited by examiner

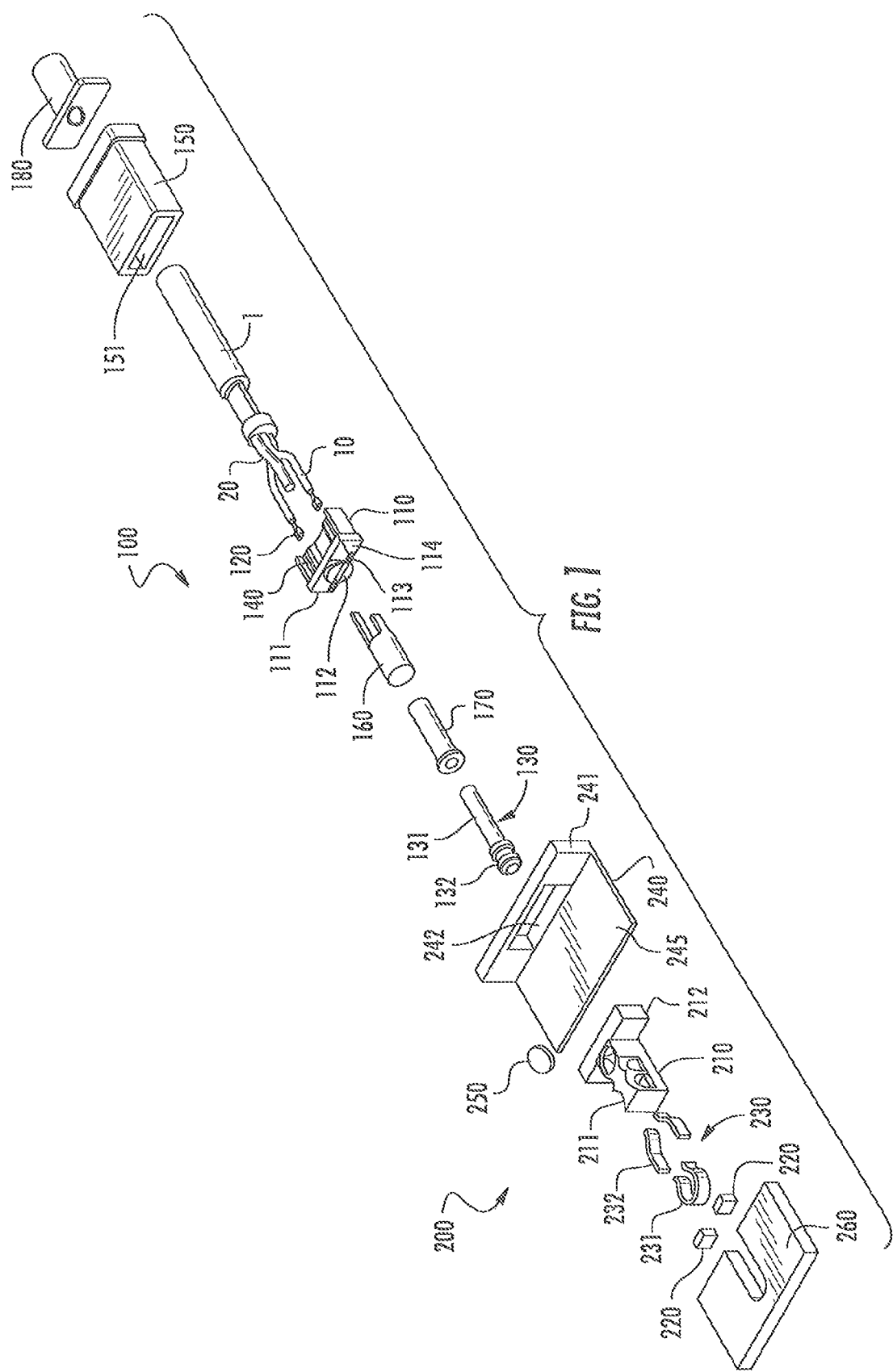

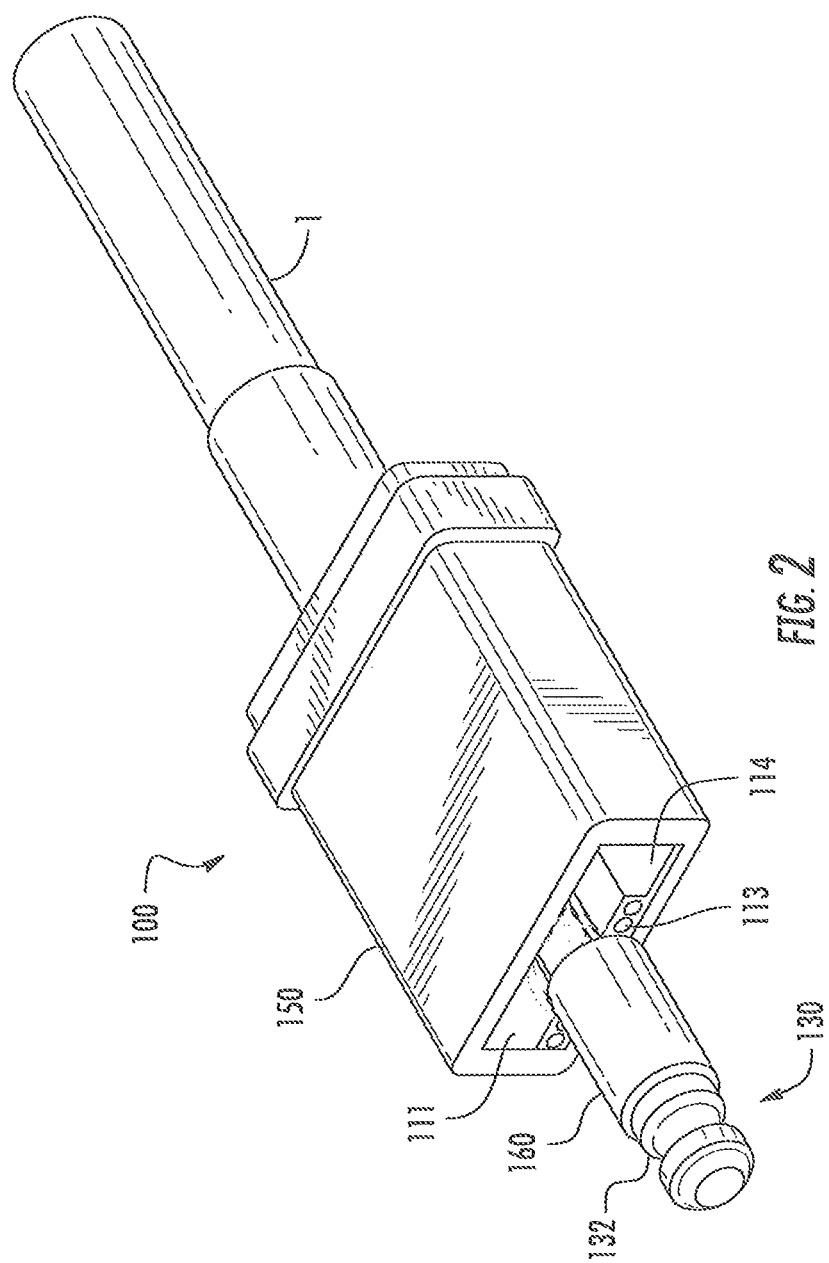

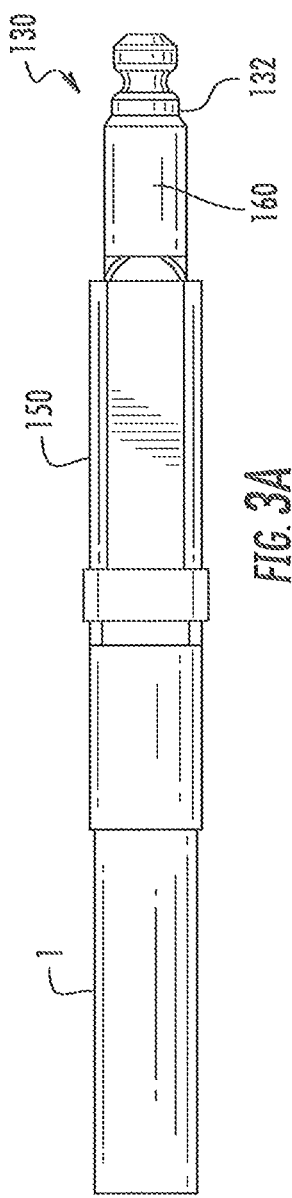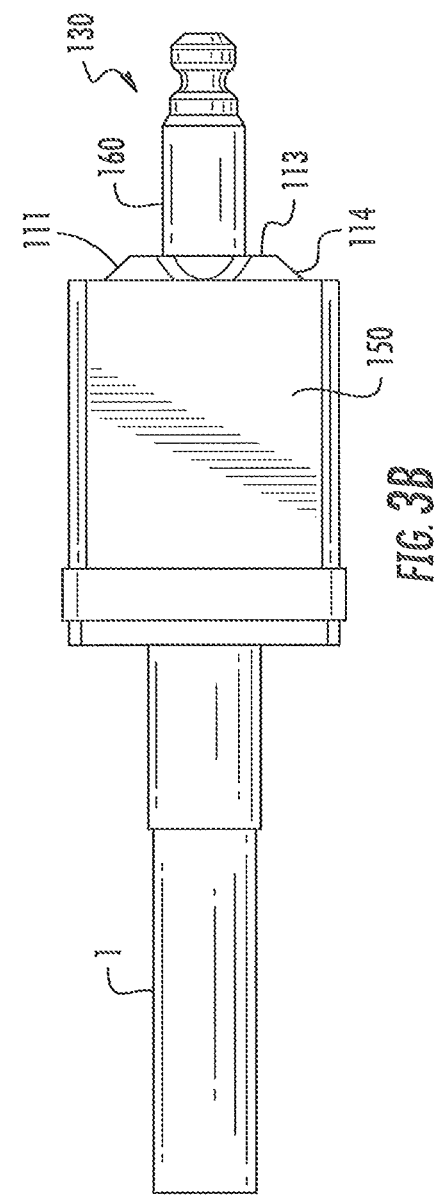

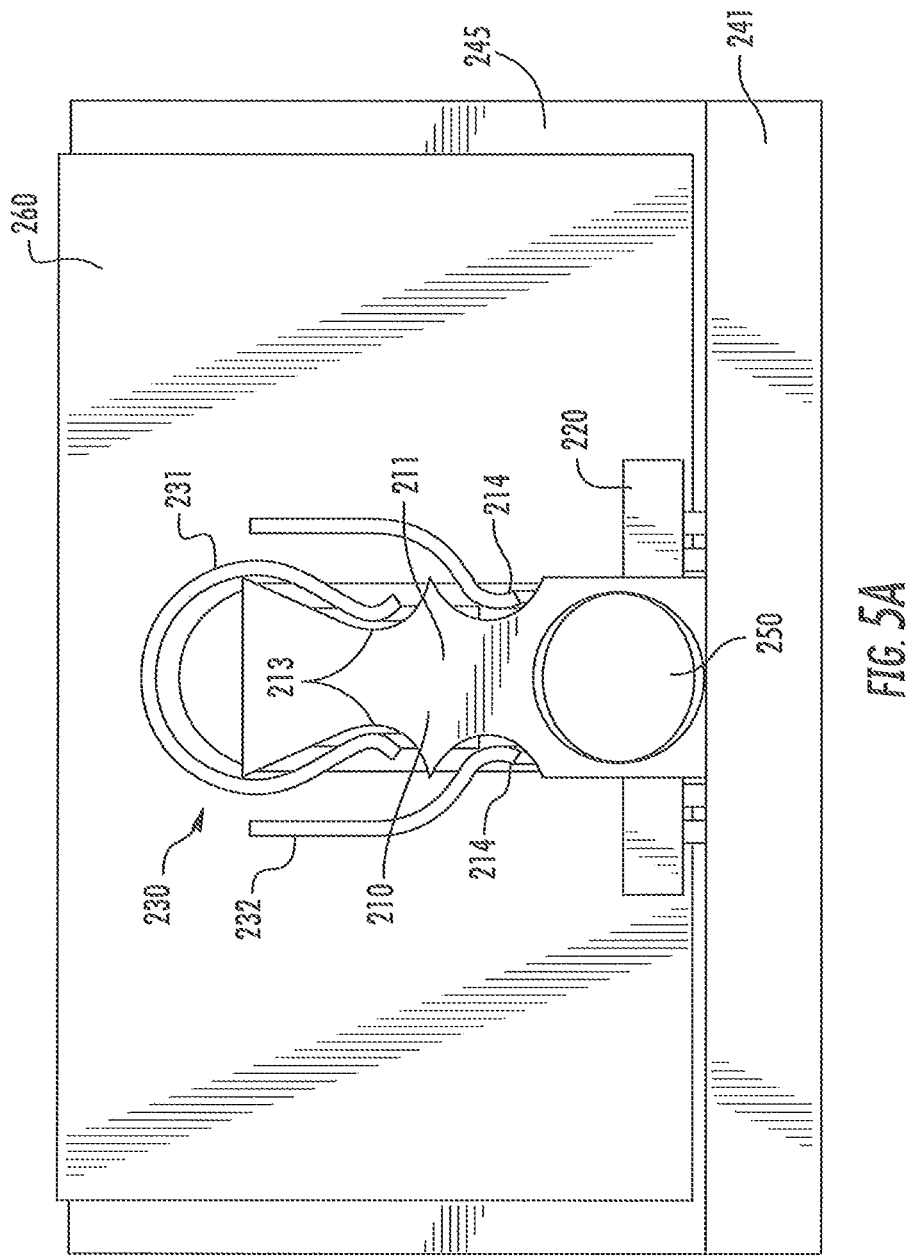

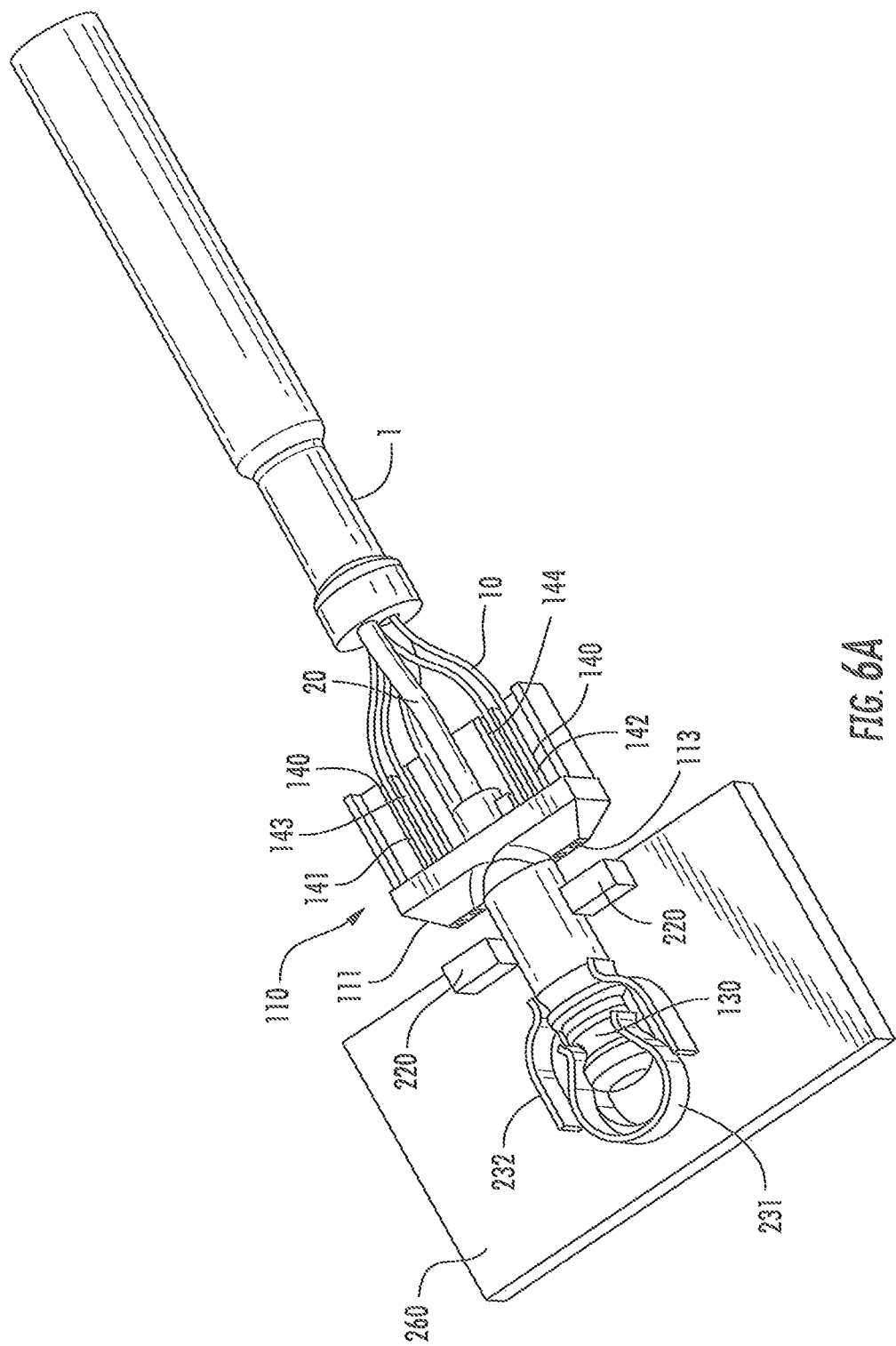

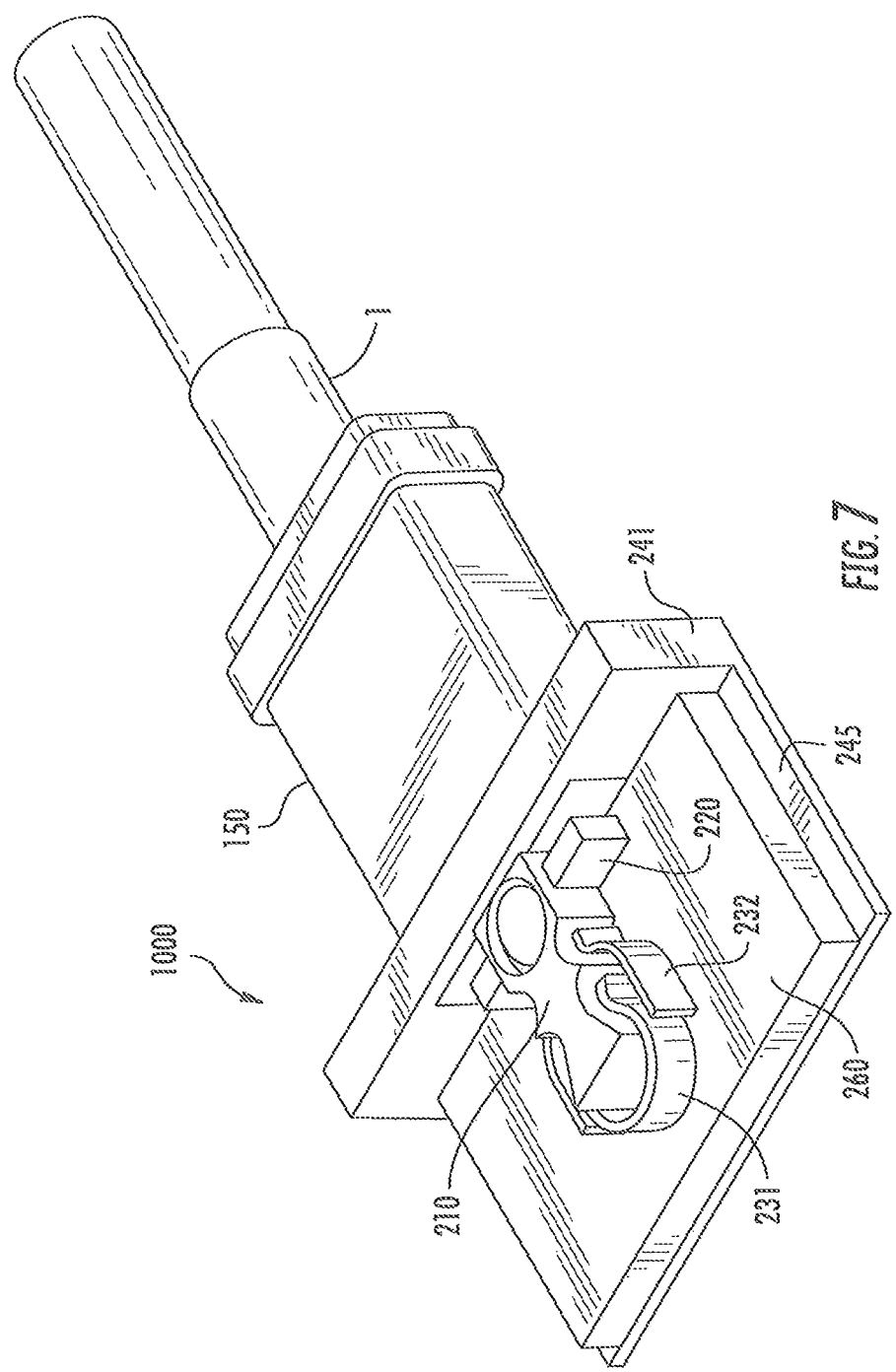

PLUG CONNECTOR TO COUPLE A HYBRID CABLE TO A RECEPTACLE

RELATED APPLICATION

This application claims the benefit of priority under 35 U.S.C. §119 of European Patent Application Serial No. 15163211.4, filed on Apr. 10, 2015, the content of which is relied upon and incorporated herein by reference in its entirety.

FIELD

The disclosure is directed to a plug connector to couple a hybrid cable comprising at least an optical fiber and an electrical conductor to a receptacle. The disclosure also relates to a receptacle to receive a plug connector to couple a hybrid cable to the receptacle. The disclosure is further directed to an interface to couple a hybrid cable to an electronic device.

BACKGROUND

It is expected that in future communication applications the amount of data to be transferred between devices is permanently increasing. This leads to an enormous increase in data rates inside individual devices and between the devices. Presently, copper connections are increasingly limited in length and/or bandwidth while optical connections offer both a high bandwidth and almost unlimited distance, except where limited by transmission protocols.

The basic function of a Device-to-Device Optical Connection (DDOC) is to transmit an optical signal for communication with low losses from a host device to a remote device and supply the remote device with electrical energy. Hybrid cables comprise optical waveguides, for example optical fibers, for transferring optical signals and electrical conductors to supply electrical power. In order to prevent additional losses occurring when transforming the optical signals into electrical signals inside a plug connector, it is necessary to directly couple the optical waveguides of a hybrid cable to the optical waveguides or optoelectronic devices of a remote device. The remote device may be configured as a consumer electronic devices, for example a smartphone or a laptop computer. The coupling of an optical waveguide of a hybrid cable with an optical waveguide of a consumer electronic device requires a precise alignment of the optical waveguides.

Furthermore, the optical interface between the hybrid cable and the consumer electronic device has to be protected from dust and/or has to be easily cleaned to allow a high optical performance when coupling optical signals via the optical interface between the hybrid cable and the electronic device. Furthermore, the small design of current consumer electronic devices requires the realization of a plug connector coupled to the hybrid cable and a receptacle of a consumer electronic device to receive the plug connector with a small form factor. The optical interface comprising the plug connector and the receptacle should have a robust design to allow a precise and reliable mechanical connection between the plug connector and the receptacle. Furthermore, the plug connector has to be securely held in the receptacle by an appropriate locking mechanism.

It is a desire to provide a plug connector to couple a hybrid cable to a receptacle to allow transmitting optical signals for communication between an electronic device and the hybrid cable with low losses and to supply electrical energy to the electronic device via the plug connector. There is also a need to provide a receptacle to receive a plug connector to couple a hybrid cable to the receptacle to allow transmitting optical signals for communication with low losses between an electronic device and the hybrid cable and to supply electrical energy to the electronic device. A further concern is to provide an interface to couple a hybrid cable to an electronic device to transmit optical signals to the electronic device with low losses and to supply electrical energy to the electronic device via the interface.

SUMMARY

An embodiment of a plug connector to couple a hybrid cable to a receptacle to transmit an optical signal for communication and supply energy to an electronic device is disclosed.

The plug connector to couple the hybrid cable to the receptacle comprises a fiber and wire holder to hold at least one optical fiber and at least one electrical conductor of the hybrid cable. The plug connector further comprises at least one optical device to change a diameter of a light beam between a first side of the at least one optical device to be coupled to the at least one optical fiber and a second side of the at least one optical device such that the light beam received from the at least one optical fiber at the first side of the at least one optical device is collimated and coupled out at the second side of the at least one optical device. The at least one optical device is arranged in the fiber and wire holder. The plug connector further comprises an electrical contact pin to be coupled to the at least one electrical conductor of the hybrid cable. The electrical contact pin has a first portion being arranged in the fiber and wire holder and a second portion protruding out of the fiber and wire holder. The second portion of the electrical contact pin has a structure being configured to be engaged in the receptacle to mechanically fix the plug connector to the receptacle.

An embodiment of a receptacle to receive a plug connector to couple a hybrid cable to the receptacle to transmit an optical signal for communication and supply electrical energy to the electronic device is also disclosed.

The receptacle to receive the plug connector to couple the hybrid cable to the receptacle comprises an insulated body comprising a hollow portion being configured to receive an electrical contact pin of the plug connector in a state in which the plug connector is coupled to the receptacle. The receptacle further comprises at least one optical device to change a diameter of a light beam coupled in the optical device. The at least one optical device is arranged in the receptacle such that the light beam coupled out of the plug connector is coupled in the at least one optical device in the state in which the plug connector is coupled to the receptacle. The at least one optical device is configured to change a collimated light beam coupled out of the plug connector and received at a first side of the at least one optical device to a focused light beam at a second side of the at least one optical device. The receptacle further comprises an engagement means to be engaged in a structure of the electrical contact pin of the plug connector to mechanically fix the plug connector to the receptacle.

An embodiment of an interface to couple a hybrid cable to an electronic device is disclosed. The interface to couple the hybrid cable to the electronic device comprises a plug connector and a receptacle being configured according to the respective embodiments specified above. In a coupled state of the plug connector to the receptacle, the electrical contact pin of the plug connector penetrates in the hollow portion of the insulated body of the receptacle and the engagement means of the receptacle engages in the structure of the electrical contact pin of the plug connector such that the plug connector is mechanically fixed to the receptacle. The fiber and wire holder of the plug connector and a front panel of the receptacle are configured such that the at least one optical device of the plug connector and the at least one optical device of the receptacle are aligned to each other to couple light between the hybrid cable and the electronic device.

The plug connector and the receptacle may be designed to be protected from dust and/or may be easily cleaned. To avoid the contamination of a slot or channel of the receptacle with debris, the entrance in the hollow portion of the insulated body of the receptacle may be protected by a sealing system comprising a dust cap. The plug connector and the receptacle include cleanable surfaces on both sides of the electrical contact pin of the plug connector and the entrance in the hollow portion of the insulated body of the receptacle. Furthermore, the plug connector and the receptacle are realized with a small form factor and a robust design which allows a precise and reliable mechanical connection between the plug connector and the receptacle. The design is symmetric and completely palindromic, very compact, and allows a low-cost assembly process.

On the plug side all mechanical and electrical functions are combined in the single electrical contact pin providing a centered electro-mechanical connection between the plug connector and the receptacle. A locking mechanism to allow a secure connection between the plug connector and the receptacle is located inside the receptacle by the engagement means intruding through at least one opening in the hollow portion of the insulated body.

In order to reduce optical losses between the at least one optical fiber of the plug connector and an optical waveguide or an optoelectronic component, such as a PD (photodiode) or a VCSEL (vertical-cavity surface emitting laser), of the electronic device, the light beam coupled out of the at least one optical fiber of the hybrid cable is collimated by the at least one optical device of the plug connector and coupled to the at least one optical device of the receptacle to focus the collimated light beam to the optical waveguide and/or the optoelectronic component of the electronic device. The at least one optical device used in the plug connector to collimate the light beam of the at least one optical fiber of the hybrid cable and the at least one optical device used in the receptacle to focus the collimated light beam may be configured as GRIN lenses.

The electrical contact pin of the plug connector together with a chamfered surfaces of a front portion of the plug connector and a chamfered surface of a channel of the receptacle to receive the plug connector ensure that the at least one optical device of the plug connector and the receptacle are positioned accurately across from an optical window in front of the optoelectronic components of the receptacle.

BRIEF DESCRIPTION OF THE DRAWINGS

FIG. 1 shows an exploded view of a plug connector and a receptacle to couple a hybrid cable to an electronic device.

FIG. 2 shows a perspective view of a plug connector terminating a hybrid cable.

FIG. 3A shows a side view of a plug connector terminating a hybrid cable.

FIG. 3B shows a top view of a plug connector terminating a hybrid cable.

FIG. 5A shows a top view of a receptacle to receive a plug connector.

FIG. 6A shows a perspective view of a coupling of a plug connector terminating a hybrid cable and a receptacle.

FIG. 7 shows a perspective view of the plug connector terminating a hybrid cable and a receptacle in a mated condition.

DETAILED DESCRIPTION

Figure 3C:
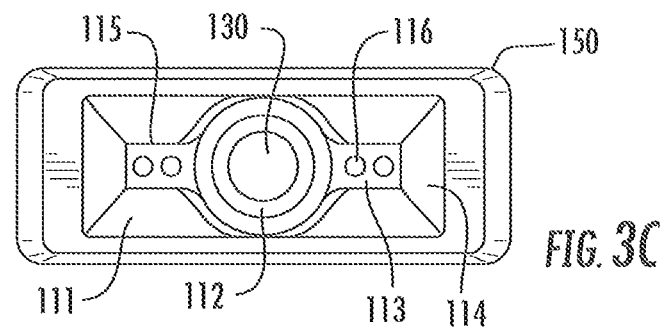
FIG. 3C shows a front view of a plug connector.

The concepts will now be described in more detail hereinafter with reference to the accompanying drawings showing different embodiments. The concepts may, however, be embodied in many different forms and should not be construed as limited to the embodiments set forth herein; rather, these embodiments are provided so that the disclosure will fully convey the scope of the concepts to those skilled in the art. The drawings are not necessarily drawn to scale but are configured to clearly illustrate the concepts disclosed.

FIG. 1 shows an exploded view of an embodiment of a plug connector 100 and a receptacle 200 to be coupled to allow a coupling of a hybrid cable to an electronic device. The hybrid cable may comprise at least one optical fiber and at least one electrical conductor. The electronic device may be a consumer electronic device, for example a smartphone or a computer. The plug connector 100 comprises a fiber and wire holder 110 to hold the at least one optical fiber 10 and the at least one electrical conductor 20 of the hybrid cable 1. The plug connector 100 further comprises at least one optical device 120 which is configured to change a diameter of a light beam between a first side of the at least one optical device to be coupled to the at least one optical fiber 10 and a second side of the at least one optical device such that the light beam received from the at least one optical fiber 10 at the first side of the optical device is collimated and coupled out at the second side of the optical device 120. The at least one optical device 120 may comprise at least one GRIN (gradient index) lens, but other lenses such as molded lenses are possible.

The plug connector 100 further comprises an electrical contact pin 130 to be coupled to the at least one electrical conductor 20 of the hybrid cable 1. The electrical contact pin 130 has a first portion 131 being arranged in the fiber and wire holder 110 and a second portion 132 protruding out of the fiber and wire holder 110. The second portion 132 of the electrical contact pin 130 has a structure being configured to be engaged in the receptacle 200 to mechanically fix the plug connector 100 to the receptacle 200.

According to a possible embodiment, the plug connector 100 may comprise at least one guidance means 140 to guide the at least one optical fiber 10 and hold the at least one optical device 120. The guidance means 140 is disposed in the fiber and wire holder 110. The plug connector further comprises a housing 150 to encapsulate the fiber and wire holder 110 and a strain relief 180. The housing comprises an opening 151. The fiber and wire holder 110 comprises a front part 111 protruding out of the opening 151 of the housing 150. The front part 111 of the fiber and wire holder 110 comprises an opening 112. The electrical contact pin 130 protrudes out of the opening 112 of the front part 111 of the fiber and wire holder.

The plug connector 100 may further comprise a contact element 160 to be coupled to the at least one electrical conductor 20. The plug connector may comprise an insulating element 170 surrounding the first portion 131 and a section of the second portion 132 of the electrical contact pin 130.

The receptacle 200 comprises an insulated body 210 which can be made of a plastic material. The insulated body 210 may comprises a hollow portion 211 being configured to receive the electrical contact pin 130 of the plug connector 100 in a state in which the plug connector 100 terminating the hybrid cable is coupled to the receptacle 200.

The receptacle 200 further comprises at least one optical device/optical engine 220 comprising a light beam modifying structure to change the shape and/or the direction of the light beam coupled in the at least one optical device from the plug connector 100 such that the light beam impinges an optoelectronic device, for example a PD (photodiode) or a VCSEL (vertical-cavity surface emitting laser). The optoelectronic device may be integrated in the optical device/optical engine 220 or may be arranged next to the optical device. The at least one optical device 220 is arranged in the receptacle 200 such that the light beam coupled out of the plug connector 100 is coupled in the at least one optical device 220 in the state in which the plug connector 100 terminating the hybrid cable is coupled to the receptacle 200.

According to a possible embodiment, the optical device 220 may be configured to change a diameter of a light beam coupled in the at least one optical device 220. In particular, the at least one optical device 220 may be configured to change a collimated light beam coupled out of the plug connector 100 and received at the first side of the at least one optical device 220 to a focused light beam at a second side of the at least one optical device 220. The optical device 220 may comprise at least one GRIN (gradient index) lens being the light beam modifying structure of the optical device.

The characteristics of a GRIN lens depend on the wavelength. A pitch of 1 of the GRIN lens is defined as the dimensionless "length" over which a beam of light transmitted through the lens performs a full sinusoidal path. A pitch of 0.5, for example, means that a beam of light transmitted through the lens performs a half sinusoidal path. The pitch is dimensionless. For each wavelength the pitch has a different actual length. The gradient index lens of the optical device 120 is configured such that a light beam which enters the lens 120 at the first side from the optical fiber in a small point-shaped area is extended to a maximum diameter at a length of 0.25 of the pitch of the lens. The expansion of the light distribution is then decreased in the receptacle 200 by a GRIN lens of the optical device 220 in the direction towards an optoelectronic device and is again focused on a small point-shaped area after a subsequent length of a pitch of 0.25 of the lens.

The receptacle 200 further comprises an engagement means 230 to be engaged in a structure of the electrical contact pin 130 of the plug connector 100 to mechanically fix the plug connector to the receptacle.

FIG. 2 shows a perspective view of the plug connector 100 terminating the hybrid cable 1. The fiber and wire holder 110, the optical device 120 and the first portion 131 of the electrical contact pin 130 are encapsulated by the housing 150. The front part 111 of the fiber and wire holder 110 protrudes out of the opening 151 of the housing 150. The front part 111 of the fiber and wire holder 110 may comprise a light-transmissive portion 113 to couple light in/out of the plug connector 100. The at least one optical device 120 is fixed to the light-transmissive portion 113 of the fiber and wire holder 110.

The front part 111 of the fiber and wire holder 110 comprises an aligning portion 114 being formed with a chamfered surface to align the plug connector 100 to the receptacle 200 in a state in which the plug connector 100 is coupled to the receptacle 200. The chamfered surface of the aligning portion 114 of the fiber and wire holder 110 tapers from the opening 151 of the housing 150 to the light-transmissive portion 113 of the fiber and wire holder 110.

The second portion 132 of the electrical contact pin 130 protrudes out of the opening 112 of the fiber and wire holder 110. The electrical contact pin includes a groove for mechanical fixation in the hollow portion 211 of the insulated body 210 of the receptacle. The plug connector provides, by means of the electrical contact pin 130 and the contact element 160, two insulated cylindrical contacts for power transmission. The electrical conductor of the hybrid cable 1 usually comprises two wires, wherein one of the wires is connected to the electrical contact pin 130 and the other wire is coupled to the contact element 160.

FIG. 3A shows a side view of the plug connector 100 terminating the hybrid cable 1. The second portion 132 of the electrical contact pin 130 protrudes out of the opening 112 of the front part 111 of the fiber and wire holder. The front section of the second portion 132 of the electrical contact pin 130 is formed with a structure being configured to be engaged in the receptacle to mechanically fix the plug connector 100 to the receptacle 200. In particular, the structure of the front section of the electrical contact pin is formed to be mechanically fixed in the hollow portion 211 of the insulated body 210. A rear section of the second portion 132 of the electrical contact pin 130 is surrounded by the contact element 160 which may be formed as a sleeve around the rear section of the second portion 132 of the electrical contact pin 130.

FIG. 3B shows a top view of the plug connector 100 terminating the hybrid cable 1. The aligning portion 114 protrudes out of the opening 151 of the housing 150. The chamfered surface of the aligning portion 114 tapers from the opening 151 of the housing 150 to the light-transmissive portion 113 of the fiber and wire holder 110. According to the embodiment of the plug connector 100 shown in FIGS. 3A and 3B the structure of the electrical contact pin 130 comprises a groove for axial fixation in the hollow portion 211 of the insulated body 210 of the receptacle.

FIG. 3C shows a front view of the plug connector 100. The electrical contact pin has a cylindrical shape and protrudes out of the opening 112 of the front part 111 of the fiber and wire holder. The light-transmissive portion 113 of the fiber and wire holder is located on both sides adjacent to the opening 112. The electrical contact pin 130 provides a cylindrical electro-mechanical contact element in the middle of the plug connector. The light-transmissive part 113 provides the optical interface and is located on both sides adjacent to the electrical contact pin 130 protruding out of the opening 112 of the front part 111 of the fiber and wire holder.

Figure 4:
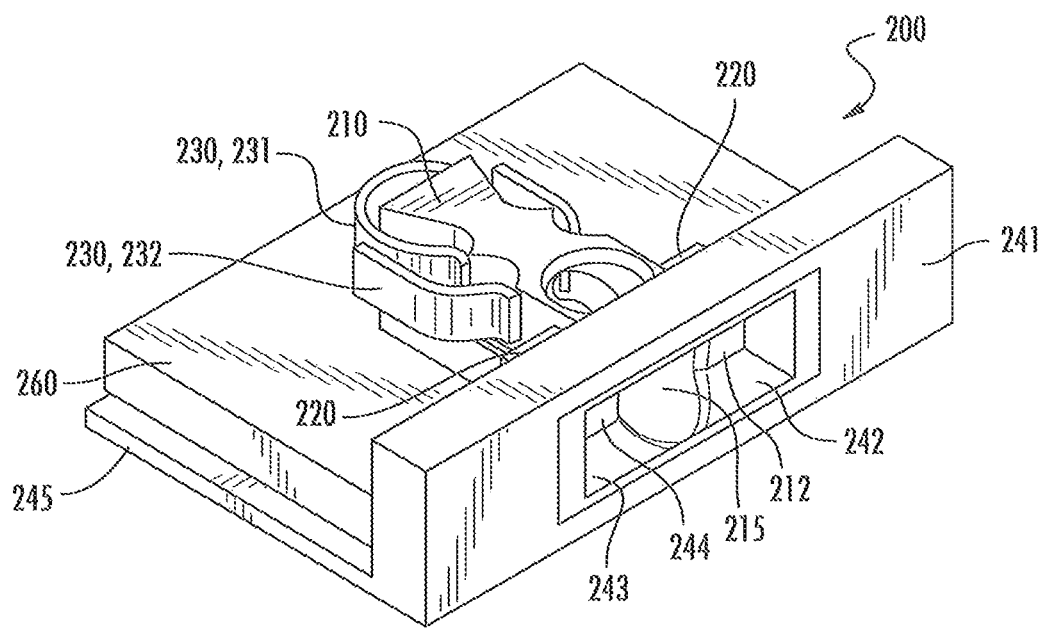
FIG. 4 shows a perspective view of a receptacle to receive a plug connector.

FIG. 4 shows a perspective view of the receptacle 200. The receptacle 200 comprises the insulated body 210 comprising the hollow portion 211 and a light-transmissive portion 212. The receptacle further comprises the optical device 220 and the engagement means 230. The insulated body 210, the optical device 220 and the engagement means 230 are arranged on a supporting substrate 260, such as a printed circuit board. The supporting substrate 260 may be disposed on a bottom surface 245 of a casing 240 of the receptacle 200.

The casing 240 comprises a front panel 241 having a channel 242 with an outer opening 243 to receive the front part 111 of the fiber and wire holder 120 of the plug connector 100 and an inner opening 244. The insulated body 210 is arranged such that the light-transmissive portion 212 of the insulated body 210 is located at the inner opening 244 of the channel 242 of the front panel 241. The channel 242 of the front panel may have a chamfered surface tapering from the outer opening 243 of the channel 242 to the inner opening 244 to align the plug connector 100 to the receptacle 200 in the state in which the plug connector is coupled to the receptacle.

The light-transmissive portion 212 of the insulating body 210 provides an optical interface to optically couple the light-transmissive portion 113 of the plug connector to the receptacle. The light-transmissive portion 212 of the insulated body 210 is located on both sides adjacent to an entrance 215 in the hollow portion 211 of the insulated body 210. The light-transmissive portion 212 is configured to provide an optical interface being cleanable from outside. According to a possible embodiment, the light-transmissive portion 212 may comprise a light-transparent surface being cleanable from the outside of the receptacle. The hollow portion 211 of the insulated body 210 is formed as a sealed cylindrical cavity to prevent the ingress of dust in the hollow portion 211 of the insulated body.

FIG. 5A shows a top view of the receptacle 200 with the insulated body 210 coupled to the front panel 241 such that the light-transmissive portion 212 of the insulated body 210 is located in the inner opening 244 of the front panel 241. The engagement means 230 may comprise contact springs 231, 232 which provide the electrical connection between the plug connector 100 and the receptacle 200. The contact springs may fix the electrical contact pin 130 in a defined position to the receptacle 200. The design offers the possibility for a defined and precise alignment of the optical paths of the plug connector and the receptacle by using spring loaded elements 231, 232 for each x-, y- and z-dimension. The electrical contact pin 130 is guided in the hollow portion 211 of the insulated body 210. At least one of the contact springs 231 is configured to lock the electrical contact pin 130 by pressing against the grooved cylindrical shape of the contact pin.

According to a possible embodiment, the engagement means 230 may comprise at least a clamp 231. The hollow portion 211 of the insulated body 210 may comprise at least a first opening 213 being configured such that the clamp 231 of the engagement means 230 penetrates in the hollow portion 211 of the insulated body 210 through the first opening 213 of the hollow portion 211 of the insulated body 210 to engage in the structure at the front section of the second portion 132 of the electrical contact pin 130 and to provide an electrical contact to the electrical contact pin 130.

According to a further embodiment, the engagement means 230 may comprise at least a second clamp 232. The hollow portion 211 of the insulated body 210 may comprise at least a second opening 214 being configured such that the at least one second clamp 232 of the engagement means 230 penetrates in the hollow portion 211 of the insulated body 210 through the at least one second opening 214 of the hollow portion 211 of the insulated body 210 to be coupled to the contact element 160 of the plug connector 100. The second clamp 232 provides an electrical contact to the contact element 160. According to a possible embodiment, the second clamp may provide an additional mechanical fixation to fix the plug connector 100 to the receptacle 200.

Figure 5B:
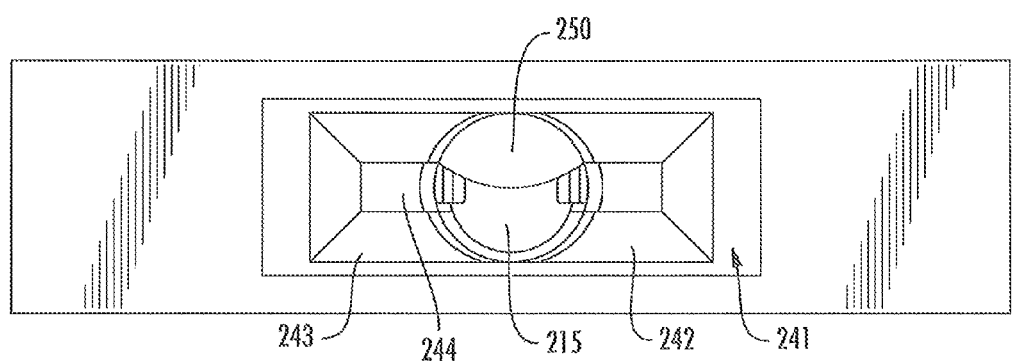
FIG. 5B shows a front view of a receptacle to receive a plug connector.

FIG. 5B shows a front view of the receptacle 200. The entrance 215 into the hollow portion 211 of the insulated body 210 is arranged in the middle of the inner opening 244 of the channel 242 of the front panel 241 of the receptacle. The light-transmissive portion 212 of the insulated body 210 is located on both sides beside the entrance 215. The channel 242 of the front panel 241 is formed with a chamfered surface tapering from the outer opening 243 to the inner opening 244 of the channel to allow aligning the plug connector 100 to the receptacle 200.

Figure 5C:
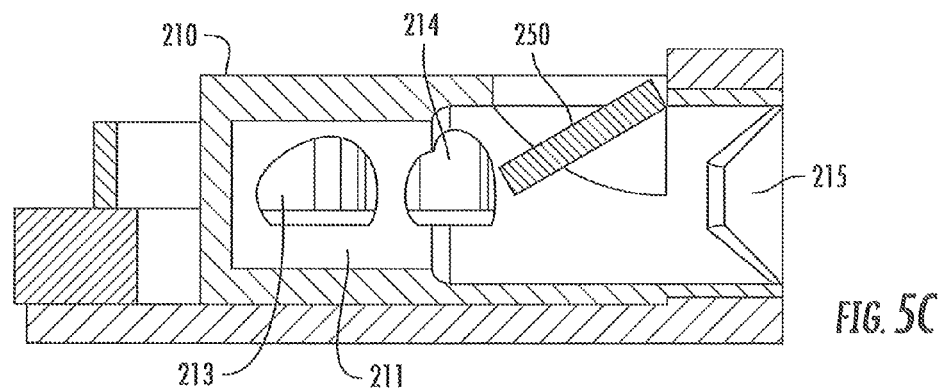
FIG. 5C shows a sectional view of a receptacle to receive a plug connector.

FIG. 5C shows a cut view of the receptacle 200. The receptacle may comprise a shutter formed as a movable dust cap 250 being configured to close the entrance 215 in the hollow portion 211 of the insulated body 210 in a state in which the plug connector 100 is not coupled to the receptacle 200. The movable dust cap 250 is configured to be moved by the electrical contact pin 130 of the plug connector 100 in an opened state to enable reception of the electrical contact pin 130 in the hollow portion 211 of the insulated body 210, when the plug connector 100 is inserted in the channel 242 of the front panel 241 and the electrical contact pin 130 is inserted in the hollow portion 211 of the insulated body.

The dust cap 250 may be configured as spring-loaded element which closes the entrance 215 in the hollow portion 211 of the insulated body 210 in an unmated configuration of the plug connector and the receptacle so that no debris or dust is able to get into the hollow portion of the insulated body. FIG. 5C shows the moving dust cap 250 between the vertical position, i.e. the closed state, and the horizontal position, i.e. the opened state. The insulated body 210 is designed to prevent dust from getting into its hollow portion 211 even if the dust cap is opened.

FIG. 5C further shows the openings 213 and 214 in the insulated body to allow the clamps 231 and 232 to get in contact to the electrical contact pin 130 and the contact element 160.

Figure 6B:
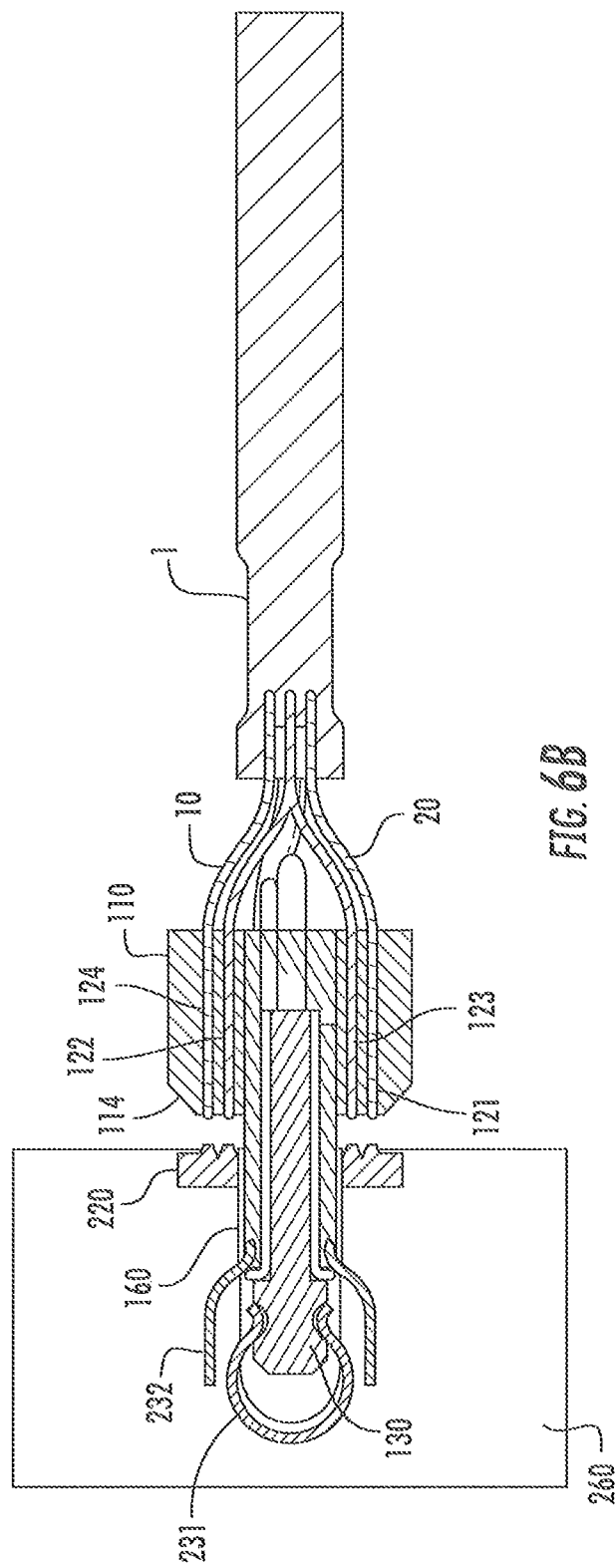
FIG. 6B shows a sectional view of a coupling of a plug connector terminating a hybrid cable and a receptacle.

FIG. 6A shows a perspective view of the fiber and wire holder 110 coupled to the hybrid cable 1 as well as the engagement means 230 and the optical device 220 disposed on the supporting substrate 250 of the receptacle. FIG. 6B shows the same arrangement of the fiber and wire holder 110 coupled to the hybrid cable 1 and the optical device 220 and the engagement means 230 of the receptacle in a top view.

According to the embodiment shown in FIGS. 6A and 6B, the hybrid cable 1 may comprise four optical fibers 10 and two wires of the electrical conductor 20. The at least one guidance means 140 is disposed in the fiber and wire holder 110 and configured to guide the optical fibers 10 and to hold the at least one optical device 120. The optical device 120 may comprise at least a first and second optical lens 121 and 122. In the embodiment shown in FIG. 6A and 6B the optical device 120 comprises four optical lenses 121, . . . , 124. The optical lenses may be embodied as GRIN lenses.

The guidance means 140 may comprise at least a first and a second guiding groove 141 and 142. The first and the second optical lenses 121 and 122 are arranged in a respective one of the first and second guiding groove 141 and 142. According to the embodiment shown in FIGS. 6A and 6B the guidance means 140 comprises four guiding grooves. A respective optical lens 121, 122, 123 and 124 is arranged in a respective one of the guiding grooves 141, 142, 143 and 144. The guiding grooves 141 and 143 are arranged adjacent to a first side of the electrical contact pin 130. The guiding grooves 142 and 144 are arranged adjacent to a second side of the electrical contact pin 130. The light-transmissive portion 113 of the fiber and wire holder 110 comprises a first section 115 located adjacent to the first side of the opening 112 of the front part 111 of the fiber and wire holder 110. A second section 116 of the light-transmissive portion 113 of the fiber and wire holder 110 is located adjacent to a second side of the opening 112 of the fiber and wire holder 110.

FIGS. 6A and 6B show that, in the configuration, when the plug connector 100 is inserted in the receptacle 200, the light-transmissive portion 113 of the fiber and wire holder 110 of the plug connector and the optical devices 220 of the receptacle are aligned by the chamfered surface of the front part 111 of the fiber and wire holder 110 and the chamfered surface of the channel 242 of the front panel 241 of the casing 240 so that light may be coupled between the light-transmissive portion 113 of the fiber and wire holder 110 and the optical devices 220 of the receptacle with low loss.

As shown in FIG. 6A, the front section of the second portion 132 of the electrical contact pin 130 is formed with a structure to allow engaging the clamp 231 of the engagement means 230 so that the electrical contact pin, and thus the plug connector 100, is securely fixed to the receptacle 200. The second portion 132 of the electrical contact pin 130 may comprise one of a recess or protrusion to enable engaging of the clamp 231 to the electrical contact pin 130. The clamp 232 of the engagement means 230 of the receptacle and the contact element 160 of the plug connector may additionally be formed such that the clamp 232 engages in a structure of the contact element 160 to provide an additional fixation between the plug connector 100 and the receptacle 200.

As shown in FIGS. 6A and 6B, one of the wires of the electrical conductor 20 is connected to the electrical contact pin 130 located in the centre of the plug connector. Another wire of the electrical conductor 20 is connected to the contact element 160 of the plug connector. The electrical contact pin which intrudes in the hollow portion 211 of the insulated body 210 ensures the alignment of the plug connector to the receptacle. The optical fibers 10 are connected to the optical devices 120, for example GRIN lenses, that are mounted in the chamfered connector body and are arranged next to the left and right side of the electrical contact pin 130.

The electrical contact pin 130 together with the chamfered surface of the front part 111 of the fiber and wire holder 110 ensure that the optical devices 120 are positioned accurately across from the optical window in front of the optical devices 220 or optoelectronic components coupled to the optical devices, such as photodiodes and VCSELs. By arranging the photodiodes on the inside, i.e. next to the insulated body 210, and the VCSELs on the outside, i.e. next to the photodiodes, or vice versa, the design is palindromic and makes both orientations of the plug connector with respect to the receptacle possible. Proper treatment of the orientation of the guiding grooves with respect to the far side device will be handled from the firmware of the plug connector or the protocol.

The design of the plug connector and the receptacle allows a flexible number of guiding grooves to be positioned on both sides of the electrical contact pin 130, so that the capacity of the optical link may be modified to fit the bandwidth need and the link protocol. A palindromic layout may be implemented with an even number of guiding grooves, while for odd numbers of guiding grooves, the plug connector will be asymmetric and cannot be realized as palindromic. In this case, a coding may be provided to ensure the mating direction and do not allow any rotation of the plug connector.

For a larger number of guiding grooves, the size of the plug connector and the receptacle need to be increased to accommodate the additional optical devices 120 and optoelectronic components. This arrangement does not impact the height of the plug connector, thus allowing a very compact design with a flexible transmission capacity.

FIG. 7 shows an interface 1000 to couple the hybrid cable 1 to a consumer electronic device. The interface 1000 comprises the plug connector 100 and the receptacle 200. FIG. 7 shows the plug connector 100 and the receptacle 200 in a mated condition. In the coupled state of the plug connector 100 to the receptacle 200 the electrical contact pin 130 of the plug connector 100 intrudes into the hollow portion 211 of the insulated body 210 of the receptacle 200 and the engagement means 230 of the receptacle engages in the structure of the electrical contact pin 130 such that the plug connector 100 is mechanically fixed to the receptacle 200.

Using a buried design, as shown in FIG. 7, allows to fix the plug connector inside of the receptacle and not at the front of the receptacle which makes a robust mechanical connection. Furthermore, the plug connector 100 is pulled into the receptacle 200, so that the chamfered front leads to a highly precise alignment of the optical paths. The optical devices/optical engines 220 may be located on the supporting substrate 260 directly behind the transparent cover of the light-transmissive portion 212 of the insulated body.

An advantage of the interface 1000 is the independent slot size of the receptacle in relation to the number of optical paths. If the number of optical paths is increased, the interface is compatible for larger designs. That means that the chamfered shape of the plug connector and the receptacle can increase in width and still be able to connect to a smaller width with less optical paths of the plug connector.

Figure 8:
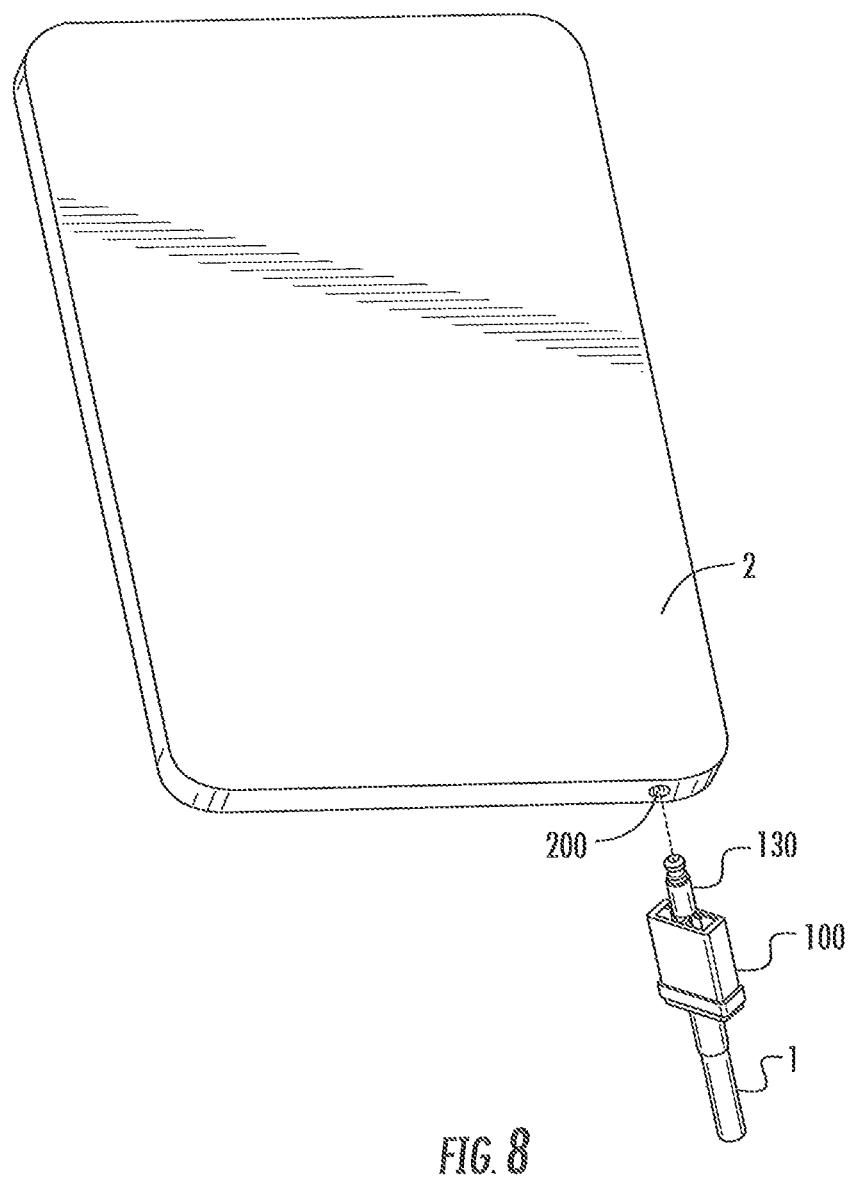
FIG. 8 shows a plug connector to be coupled to a consumer electronic device.

FIG. 8 shows the plug connector 100 terminating the hybrid cable 1 to be coupled to a consumer electronic device 2, such as a mobile phone or a tablet computer. The receptacle 200 is arranged in the housing of the consumer electronic device 2. The chamfered surface of the aligning portion 114 of the fiber and wire holder 110 of the plug connector 100 and the chamfered surface of the channel 242 of the front panel 241 of the receptacle 200 are configured such that the at least one optical device 120 of the plug connector 100 and the at least one optical device 220 of the receptacle 200 are aligned to each to couple light between the hybrid cable 1 and the consumer electronic device 2 with low loss. The precise alignment of the optical components of the plug connector and the receptacle allow that a conversion of optical signals into electrical signal in the plug connector before the coupling to the receptacle is not necessary.

The design of the optical interface allows to provide the plug connector 100 and the receptacle 200 with a small form factor. The electrical contact pin 130 of the plug connector as well as the insulated body of the receptacle are reduced to a minimum in height and width to accommodate small parent devices, in particular consumer electronic devices, for example mobile phones or computers. The electrical contact pin fulfills both the mechanical and electrical function which result in a robust connection inside the consumer electronic device.

The optical beams are directly guided from the plug connector into the respective parent device where they are coupled to an optical device/optical engine or a waveguide. For a suitable optical performance the light-transmissive portion of the plug connector and the light-transmissive portion of the receptacle are easily accessible and can be cleaned from the outside. In case of a broken linked because of dirt or debris, a user is able to clean the surfaces of the respective light-transmissive portions of the plug connector and the receptacle and reestablish the optical link independently.

The design further allows to lock the plug connector in the receptacle and use the chamfered outer shape of the plug connector to fix its angular position and precisely align it with respect to the receptacle. The symmetric is palindromic and allows the plug connector to be connected to the receptacle in both orientations, i.e. bottom or top orientated up.

We claim:

1. A plug connector to couple a hybrid cable to a receptacle, comprising:
    a fiber and wire holder to hold at least one optical fiber and at least one electrical conductor of the hybrid cable;
    at least one optical device to change a diameter of a light beam between a first side of the at least one optical device to be coupled to the at least one optical fiber and a second side of the at least one optical device such that the light beam received from the at least one optical fiber at the first side of the at least one optical device is collimated and coupled out at the second side of the at least one optical device, wherein the at least one optical device is arranged in the fiber and wire holder; and
    an electrical contact pin to be electrically coupled to the at least one electrical conductor of the hybrid cable, the electrical contact pin having a first portion being arranged in the fiber and wire holder and a second portion protruding out of the fiber and wire holder, wherein the second portion of the electrical contact pin has a recess being configured to be engaged in a clamp of the receptacle to mechanically fix the plug connector to the receptacle;
    a housing to encapsulate the fiber and wire holder, the housing comprises an opening, wherein the fiber and wire holder comprises a front part protruding out of the opening of the housing;
    wherein the front part of the fiber and wire holder comprises an opening, wherein the electrical contact pin protrudes out of the opening of the front part of the fiber and wire holder;
    wherein the front part of the fiber and wire holder comprises a light-transmissive portion to couple light in/out of the plug connector;
    wherein the at least one optical device is fixed to the light-transmissive portion of the fiber and wire holder;
    wherein the front part of the fiber and wire holder comprises an aligning portion being formed with a chamfered surface to align the plug connector to the receptacle in a state in which the plug connector is coupled to the receptacle; and
    wherein the chamfered surface of the aligning portion of the fiber and wire holder tapers from the opening of the housing to the light-transmissive portion of the fiber and wire holder.

2. The plug connector of claim 1, comprising:
    at least one guidance means to guide the at least one optical fiber and hold the at least one optical device, wherein the at least one guidance means is disposed in the fiber and wire holder.

3. The plug connector of claim 1, wherein the at least one optical device comprises at least a first and a second optical lens;
    wherein the at least one guidance means comprises at least a first and a second guiding groove, and the first and the second optical lenses are arranged in a respective one of the first and second guiding groove;
    wherein the first guiding groove is arranged adjacent to a first side of the first portion of the electrical contact pin and the second guiding groove is arranged adjacent to a second side of the first portion of the electrical contact pin; and
    wherein the light-transmissive portion of the front part of the fiber and wire holder comprises a first section located adjacent to a first side of the opening of the front part of the fiber and wire holder and a second section located adjacent to a second side of the opening of the front part of the fiber and wire holder.

4. The plug connector of claim 1, wherein the second portion of the electrical contact pin comprises a protrusion to engage in the receptacle to mechanically fix the plug connector to the receptacle.

5. The plug connector claim 1, comprising:
    a contact element to be electrically coupled to a first one of the at least one electrical conductor;
    an insulating element surrounding the first portion and a section of the second portion of the electrical contact pin; and
    wherein the first portion of the electrical contact pin is configured to be electrically coupled to a second one of the at least one electrical conductor.

6. The plug connector of claim 1, wherein the at least one optical device comprises at least one GRIN lens.

7. A receptacle to receive a plug connector to couple a hybrid cable to the receptacle, comprising:
    an insulated body comprising a hollow portion being configured to receive an electrical contact pin of the plug connector in a state in which the plug connector is coupled to the receptacle, wherein the insulated body comprises a light-transmissive portion;
    at least one optical device to change a diameter of a light beam coupled in the optical device, wherein the at least one optical device is arranged in the receptacle such that the light beam coupled out of the plug connector is coupled in the at least one optical device in the state in which the plug connector is coupled to the receptacle;
    wherein the at least one optical device is configured to change a collimated light beam coupled out of the plug connector and received at a first side of the at least one optical device to a focused light beam at a second side of the at least one optical device;
    a front panel comprising a channel having an outer opening to receive the plug connector and an inner opening, wherein the insulated body is arranged such that the light-transmissive portion of the insulated body is located at the inner opening of the channel of the front panel and the channel of the front panel has a chamfered surface tapering from the outer opening of the channel to the inner opening to align the plug connector to the receptacle such that light coupled out of the plug connector is optically coupled in the light-transmissive portion of the insulated body in the state in which the plug connector is coupled to the receptacle; and
    an engagement means to be engaged in a recess of the electrical contact pin of the plug connector to mechanically fix the plug connector to the receptacle.

8. The receptacle of claim 7, wherein the engagement means comprises at least a first clamp;
wherein the hollow portion of the insulated body comprises at least a first opening being configured such that the at least one first clamp of the engagement means penetrates in the hollow portion of the insulated body through the at least first opening of the hollow portion of the insulated body to engage in the structure of the electrical contact pin of the plug connector and to provide an electrical contact to the electrical contact pin of the plug connector.

9. The receptacle of claim 8, wherein the engagement means comprises at least a second clamp;
wherein the hollow portion of the insulated body comprises at least a second opening being configured such that the at least one second clamp of the engagement means penetrates in the hollow portion of the insulated body through the at least second opening of the hollow portion of the insulated body to be coupled to the contact element of the plug connector.

10. The receptacle of claim 7, comprising:
a movable dust cap, wherein the movable dust cap is configured to close an entrance in the hollow portion of the insulated body in a state in which the plug connector is not coupled to the receptacle; and
wherein the movable dust cap is configured to be moved by the electrical contact pin of the plug connector in an opened state to enable receiving of the electrical contact pin in the hollow portion of the insulated body, when the plug connector is inserted in the channel of the front panel.

11. An interface to couple a hybrid cable to an electronic device, comprising:
a plug connector of claim 1 and a receptacle;
wherein, in a coupled state of the plug connector to the receptacle, the electrical contact pin of the plug connector penetrates in a hollow portion of an insulated body of the receptacle and an engagement means of the receptacle engages in the structure of the electrical contact pin of the plug connector such that the plug connector is mechanically fixed to the receptacle; and
wherein the fiber and wire holder of the plug connector and a front panel of the receptacle are configured such that the at least one optical device of the plug connector and the at least one optical device of the receptacle are aligned to each other to couple light between the hybrid cable and the electronic device.

12. The receptacle of claim 7, wherein the engagement means comprises a first clamp, and the first clamp is configured to lock the electrical contact pin by pressing against the recess of the electrical contact pin.

13. The receptacle of claim 12, wherein the first clamp is configured to provide an electrical contact to the electrical contact pin.

14. The receptacle of claim 12, wherein the engagement means comprises a second clamp, and the second clamp is configured to lock the electrical contact pin by pressing against the recess of the electrical contact pin.

15. The receptacle of claim 12, wherein the engagement means comprises a contact spring.

16. A plug connector to couple a hybrid cable to a receptacle, comprising:
a fiber and wire holder to hold at least one optical fiber and at least one electrical conductor of the hybrid cable;
at least one optical device to change a diameter of a light beam between a first side of the at least one optical device to be coupled to the at least one optical fiber and a second side of the at least one optical device such that the light beam received from the at least one optical fiber at the first side of the at least one optical device is collimated and coupled out at the second side of the at least one optical device, wherein the at least one optical device is arranged in the fiber and wire holder;
an electrical contact pin to be electrically coupled to the at least one electrical conductor of the hybrid cable, the electrical contact pin having a first portion being arranged in the fiber and wire holder and a second portion protruding out of the fiber and wire holder, wherein the second portion of the electrical contact pin has a grooved cylindrical shape being configured to be engaged in a clamp of the receptacle to mechanically fix the plug connector to the receptacle;
a housing to encapsulate the fiber and wire holder, the housing comprising an opening; and
an insulating element surrounding the first portion of the electrical contact pin, wherein the electrical contact pin protrudes out of the opening of the housing.

\* \* \* \* \*